United States Patent [19]
Delrue et al.

[11] Patent Number: 6,056,990
[45] Date of Patent: May 2, 2000

[54] MILLED CEREAL BY-PRODUCT WHICH IS AN ADDITIVE FOR FLOUR AND DOUGH

[75] Inventors: Rita M. Delrue, Minnetonka, Minn.; Mark D. Burianek, Greenwood, Ind.; Carol J. Xenides, Indianapolis, Ind.; Steve T. Sheehan, Fishers, Ind.; Sergio Valle, Indianapolis, Ind.

[73] Assignee: Cargill, Incorporated, Minneapolis, Minn.

[21] Appl. No.: 08/857,770

[22] Filed: May 15, 1997

[51] Int. Cl.$^7$ .................................................. A21D 2/00
[52] U.S. Cl. ........................... 426/622; 426/463; 426/549; 426/618; 426/626
[58] Field of Search .................................... 426/463, 331, 426/622, 626, 549, 482, 618

[56] References Cited

U.S. PATENT DOCUMENTS

| | | | |
|---|---|---|---|
| Re. 31,513 | 1/1984 | Glen | 426/521 |
| 2,704,257 | 3/1955 | De Sollano et al. | 99/93 |
| 3,035,918 | 5/1962 | Sorgenti et al. | 99/1 |
| 3,194,664 | 7/1965 | Eytinge | 99/80 |
| 3,212,904 | 10/1965 | Gould et al. | 99/93 |
| 3,368,902 | 2/1968 | Berg | 99/83 |
| 3,404,986 | 10/1968 | Wimmer et al. | 99/93 |
| 3,554,772 | 1/1971 | Hankinson et al. | 99/215 |
| 3,653,915 | 4/1972 | Rubio | 99/80 |
| 3,655,385 | 4/1972 | Rubio | 99/80 |
| 3,859,452 | 1/1975 | Mendoza | 426/375 |
| 4,221,340 | 9/1980 | dos Santos | 241/7 |
| 4,255,459 | 3/1981 | Glen | 426/521 |
| 4,329,371 | 5/1982 | Hart | 426/461 |
| 4,555,409 | 11/1985 | Hart | 426/242 |
| 4,594,260 | 6/1986 | Vaqueiro et al. | 426/622 |
| 4,770,891 | 9/1988 | Willard | 426/559 |
| 4,844,937 | 7/1989 | Wilkinson et al. | 426/559 |
| 4,882,188 | 11/1989 | Sawada et al. | 426/438 |
| 4,985,269 | 1/1991 | Irvin et al. | 426/560 |
| 4,996,063 | 2/1991 | Inglett | 426/21 |
| 5,176,931 | 1/1993 | Herbster | 426/242 |
| 5,225,224 | 7/1993 | VanNortwick | 426/549 |
| 5,296,253 | 3/1994 | Lusas et al. | 426/629 |
| 5,532,013 | 7/1996 | Martinez-Bustos et al. | 426/496 |
| 5,558,886 | 9/1996 | Martinez-Bustos et al. | 425/376.1 |
| 5,558,898 | 9/1996 | Sunderland | 426/626 |
| 5,652,010 | 7/1997 | Gimmler et al. | 426/549 |

FOREIGN PATENT DOCUMENTS

WO 97/29647  8/1997  WIPO.

OTHER PUBLICATIONS

Mensah–Agyapong, J. et al., "Nixtamalization of Maize (zea mays L) Using a Single Cook–Extrusion Process on Lime–Treated Grits", *J. Sci. Food Agric.*. 60:509–514, 1992.

Martinez et al., "Caracteristicas quimicas y usos de harina instantanea de maiz II.", *Archivos Latinoamericanos de Nutricion*, 1993, 43, 316–320.

O. Parades–Lopez et al., "Maize: A Review of Tortilla Production Technology," *Bakers Digest*, 57:16–25 (1983).

S. A. Watson et al., *Corn: Chemistry and Technology*, pp. 410–429 (American Association of Cereal Chemists, Inc., St. Paul, Minnesota, 1991).

C. Bazúa et al., "Extruded Corn Flour as an Alternative to Lime–Heated Corn Flour for Tortilla Preparation," *Institute of Food Technologies*, 1979.

S. Bedolla et al., "Cooking Maize for Masa Production," *Cereal Foods World*, vol. 27, No. 5, pp. 219–221 (1982).

M. N. Kahn et al., "Corn Tortillas: Evaluation of Corn Cooking Procedures," *Cereal Chem*, 59(4), 279–284, 1982.

*Primary Examiner*—Lien Tran
*Attorney, Agent, or Firm*—Fitch, Even, Tabin & Flannery

[57] ABSTRACT

An additive composition made from milled cereal by-products. The additive is for enhancing the strength and/or stability of tortillas and related products. The additive composition comprises a cooked cereal by-product which includes gelatinized edible starch. The starch is gelatinized to an extent, and is present in an amount, such that when the composition additive is added to masa or other cereal grain flour or dough at a level of at least about 0.5 weight percent the composition additive is effective for increasing the strength and/or the shelf life of tortillas made from the additive and flour.

15 Claims, 1 Drawing Sheet

MILLED CEREAL BY-PRODUCT WHICH IS AN ADDITIVE FOR FLOUR AND DOUGH

BACKGROUND OF THE INVENTION

1. Field of the Invention

The present invention generally relates the production of tortillas and related products. More particularly, it pertains to an additive composition for corn and other cereal grain flour to impart advantageous qualities to tortillas and related products produced therefrom.

2. Background and Description of Related Art a. BACKGROUND

Tortillas

Tortillas, which are prepared from unleavened, unshortened, flat, circular dough pieces generally made from nixtamalized corn or corn flour and baked on a griddle. Corn has been the traditional cereal for the preparation of tortillas and similar food items in Mexico and Central America from masa. However, other cereal grains, such as sorghum or wheat, may be employed for this purpose. The dough which is used in making tortillas and related products generally only contains ground limed or non-limed whole corn and water.

Tortillas may be used to prepare other corn-containing products, such as tortilla chips, corn chips, taco shells, tostadas, enchiladas, burritos, nachos, sopapillas, tamales and other maize and non-maize snacks and products by methods known by those having skill in the art.

Tortillas have a high moisture content (generally about 45 weight percent moisture of the total weight of the tortillas after cooking). This significantly affects their strength, stability and nutrient density.

The strength of the tortillas is directly related to the stability (shelf life) of the tortillas. It is well-known that tortillas, when kept under conditions in which no moisture is lost, nevertheless become hard and inflexible (stale) with the passage of time, and break or crumble easily when flexed or bent. This effect increases with time. Freshly made tortillas are very flexible, but lose their flexibility with the passage of time. The hardening (loss of flexibility) or staling generally increases with decreasing temperature, and are believed to be due to a physico-chemical change in the starch constituent of tortillas (retrogradation). Tortillas, when prepared normally without additives, generally have a maximum shelf life of about 12 to about 15 hours. After such time, they are generally spoiled by microorganisms, and become hard or stale.

For the preparation of refined foods, corn is usually subjected to a milling process. In these processes, the hulls (bran) and germ, which are the structures rich in minerals and vitamins, are more or less completely removed. The refined mill products, such as masa flour, consist chiefly of the endosperm. Portions of the corn kernel removed from the endosperm, such as the hulls or bran, are considered to be waste by-products which are often put into animal feed.

Components of the Maize (Corn) Kernel

Botanically, a maize kernel is known as a caryposis, a dry, one-seeded, nutlike berry in which the fruit coat and seed are fused to form a single grain. Mature kernels are composed of four major parts: pericarp (hull or bran), germ (embryo), endosperm and tip cap. The average composition of whole maize, and its fractions, on a moisture-free (dry) basis is as follows:

| Fraction of Whole Maize | Kernel % | Starch % | Protein % | Liquid % | Sugar % | Ash % |
|---|---|---|---|---|---|---|
| Whole Grain | 100 | 71.5 | 10.3 | 4.8 | 2.0 | 1.4 |
| Endosperm | 82.3 | 86.4 | 9.4 | 0.8 | 0.6 | 0.3 |
| Germ | 11.5 | 8.2 | 18.8 | 34.5 | 10.8 | 10.1 |
| Pericarp | 5.3 | 7.3 | 3.7 | 1.0 | 0.3 | 0.8 |
| Tip cap | 0.8 | 5.3 | 9.1 | 3.8 | 1.6 | 1.6 |

Pericarp: The maize kernel is covered by a water-impermeable cuticle. The pericarp (hull or bran) is the mature ovary wall which is beneath the cuticle, and comprises all the outer cell layers down to the seed coat. It is high in non-starch-polysaccharides, such as cellulose and pentosans. (A pentosan is a complex carbohydrate present in many plant tissues, particularly brans, characterized by hydrolysis to give five-carbon-atom monosaccharides (pentoses). It is any member of a group of pentose polysaccharides having the formula $(C_5H_8O_4)_n$ found in various foods and plant juices.) Because of its high fiber content, the pericarp is tough.

Germ: The scutellum and the embryonic axis are the two major parts of the germ. The scutellum makes up 90% of the germ, and stores nutrients mobilized during germination. During this transformation, the embryonic axis grows into a seedling. The germ is characterized by its high fatty oil content. It is also rich in crude proteins, sugars, and ash constituents. The scutellum contains oil-rich parenchyma cells which have pitted cell walls. Of the sugars present in the germ, about 67% is glucose.

Endosperm: The endosperm contains the starch, and is lower in protein content than the germ and the bran. It is also low in crude fat and ash constituents.

Tip cap: The tip cap, where the kernel is joined to the cob, is a continuation of the pericarp, and is usually present during shelling. It contains a loose and spongy parenchyma.

Corn Milling

In milling corn to obtain flour, the corn is first cleaned, and is then usually passed through a scourer to remove the tip from the germ end of the kernel. The corn is then tempered by the addition of water to a moisture content which is generally from about 21% to about 24%. The corn is frequently then passed through a corn degerminator, which frees the bran and germ, and breaks the endosperm into two or more pieces. The stock from the degerminator is generally dried to about 14% to 16% moisture in revolving dryers equipped with steam coils, and is then cooled in revolving or gravity-type coolers. The stock is next passed through a hominy separator, which first separates the fine particles, and then grades and polishes the larger fragments into four sizes. The various grades of broken corn are passed through centrifugal-type aspirators to remove any loose bran from the endosperm fragments, and produce milled cereal by-products such as aspirated bran. These by-products are waste products which heretofore had little value.

"Aspirated bran" is an impure form of whole bran which generally contains some of the floury endosperm, and the starch and protein present therein, and some germ, and the protein present therein, and may contain some grits. Generally, most of the germ and grits will already have been removed from the cereal grain at this point in the milling process. It is possible for the aspirated bran to contain no germ, to contain all of the germ, or to contain any amount of germ in between. Similarly, the aspirated bran fraction may contain no grits from the cereal grain, may contain all of the grits, or may contain any amount of the grits in between. The milled cereal by-product or aspirated bran which may be used to prepare the additive composition of the invention should contain at least about 15 weight percent starch, at least about 6 weight percent protein, and at least about 2 weight percent crude fiber. These percentages are based upon the weight of the by-product or bran which naturally includes moisture if it is not subjected to drying. This naturally occurring moisture in the by-product or bran ranges from about 10 to about 15 weight percent of the bran.

Masa Flour and Dough

Masa flour (dry corn flour which has usually been nixtamalized) and masa (corn dough which has usually been nixtamalized) are raw materials which may be used for the preparation of tortillas, corn chips, tortilla chips, taco shells, nachos and similar products.

Nixtamalization is the cooking of cereal grain, such as whole corn kernels, in a medium which usually contains an alkaline agent, such as water containing lime (CaO). Thereafter there is steeping (soaking) of the cereal grain for a period of time, for example, for about three to about fourteen hours, subsequent draining of any remaining cooking liquor, washing of the cereal grains, and grinding of the cereal grains to make with drying a cereal grain flour, which may be added with water to make a cereal grain dough from which tortillas and related products may be prepared. It is well-known that not only tortillas, but also masa dough used to make tortillas, prepared without additives are extremely unstable, and have a relatively short shelf life.

It would be advantageous to provide an additive composition for flour or dough which is used to make tortillas and related products which would significantly increase the strength of the products, and which would increase the shelf life (stability) and staling time of the products from about 12 to about 15 hours to from about 14 to about 21 days. It would also be advantageous to provide such an additive which increases the nutritional value of products produced from the flour or dough by providing such products with a higher fiber content, and with additional vitamins and minerals. Further, it would be advantageous to produce such an additive composition without the production of liquid waste with a material which is essentially a waste by-product from the milling of cereal, such as whole corn. It would also be advantageous to provide tortillas and related products prepared with such an additive which would retain the flavors and other positive attributes of tortillas and related products prepared without such additive.

The additive of the present invention imparts the advantageous properties described above to tortillas and related products. Tortillas and related products prepared with the inexpensive and nutritious additive of the present invention become stale much more slowly than tortillas and related products produced from flour or dough which do not contain this additive or other shelf life extender. The additive retards hardening with the passage of time, retards loss of flexibility with time, prolongs the shelf life of the tortillas and related products and increases the freshness of both freshly-made tortillas and reheated tortillas and related products.

Moreover, the tortillas and related products produced from such flour or dough will be more nutritious and healthful than products produced from flour or dough which does not contain this additive. They will have a higher fiber content, and also include vitamins and minerals which are present in cereal by-product from which the additive is made.

B. DESCRIPTION OF THE RELATED ART

U.S. Pat. No. 3,653,915 does not describe an additive made from a milling by-product, but rather states that mono or diglycerides of long chain fatty acids or polyoxyethylene monostearate may be incorporated into tortilla dough in order to retard the staling of tortillas.

U.S. Pat. No. 3,655,385 does not describe an additive made from a milling by-product, but rather states that a hydrophilic edible gum, such as locust bean gum or gum arabic, may be incorporated into tortilla dough in order to retard the staling of tortillas.

U.S. Pat. No. 4,555,409 states that masa may be prepared from corn and grain sorghum. Processed corn and grain sorghum are blended and ground to form a meal. The patent describes preparing grain sorghum by dehusking the grain, radiating the resulting grain with an infrared source, rolling the grain, cracking the kernels, removing remaining husk, and milling the kernels.

U.S. Pat. No. 4,594,260 describes preparing nixtamalized corn flour by subjecting whole corn kernels to a process of cleaning the kernels, boiling the kernels in an aqueous liquor, crushing the kernels to form a particulate corn material, classifying the particles to produce a hull fraction isolated from the endosperm/germ fraction, subjecting only the hull fraction to a nixtamalization step by heating the hull fraction suspended in an aqueous alkaline solution, draining the spent alkaline liquor, washing the nixtamalized hull fraction, mixing the hull fraction with the untreated endosperm/germ fraction, drying the mixture and grinding the mixture.

Unlike the present invention, the process described in the '260 patent avoids undue gelatinization of starch contained in the endosperm of whole corn. The corn flour produced by the process contains most of the starch in a hydrated, but not gelatinized, form (columns 9 and 10). Nixtamalization of the endosperm of the kernels is described as not only unnecessary, but undesirable (columns 7–9).

SUMMARY OF THE INVENTION

The present invention provides an additive composition which is a by-product of cereal milling wherein the additive enhances the strength and/or shelf life of tortillas and related products made from masa (or other cereal grain) flour or dough. The additive comprises a cereal grain by-product which includes edible starch which has been gelatinized by cooking it with water and an alkaline agent. The starch is present in an amount and is cooked to an extent, such that when the additive composition is added to masa (or other cereal grain) flour or dough at a level, such as at least about 0.5 weight percent, the additive is effective for increasing the strength and/or the shelf life of tortillas or other products made with such flour or dough. The increase in strength or shelf life is relative to tortillas or other products made with masa (or other cereal grain) flour or dough, but without the bran additive composition or any other shelf life extenders. In an important aspect, the additive composition comprises aspirated corn bran having at least about 15 weight percent starch, of which at least about 50 weight percent has been gelatinized, at least about 6 weight percent protein, and at least about 2 weight percent crude fiber. In another important aspect, the starch in the bran is gelatinized by cooking it with at least about 0.05 weight percent, based upon the weight of the bran, calcium oxide or lime or equivalent thereof. This should provide the additive with at least about 0.025 weight percent calcium, based upon the weight of the additive. The additive should also provide a pH of at least about 7 when it is mixed with water and the additive comprises about 10 weight percent of the additive/water mixture.

The invention also provides a masa (or other cereal grain) flour blend and a process for making such flour blend. The flour blend of the invention is mixed with at least about 40 weight percent water to form a dough of the invention. In an important aspect, the additive comprises at least about 0.5 weight percent of masa (or other cereal grain) flour blend, and in a very important aspect comprises from about 1 to about 6 weight percent of the masa (or other cereal grain) flour blend. The masa flour blend is provided by mixing the additive with masa (or other cereal grain) flour.

Tortillas may be prepared from the dough of the invention by known methods. The flavors and other positive attributes of tortillas and related products produced without the additive of the invention are retained when this additive is incorporated into these products.

The invention also includes a process for making the additive composition. The method comprises mixing aspirated bran comprising at least about 15 weight percent starch with an alkaline agent and water to provide an aqueous alkaline bran mixture and cooking the alkaline bran mixture to gelatinize the starch and provide a cooked alkaline-treated bran. The starch is gelatinized to an extent that when the additive is present in the masa (or other cereal grain) flour at a level of at least about 0.5 weight percent, the additive composition is effective for increasing the strength and/or the shelf life of tortillas as aforesaid. The cooked alkaline-treated bran is dried without first removing aqueous alkaline water, such as lime water, to provide a dried alkaline-treated bran. Thereafter, the alkaline treated bran is milled to a particle size, such that it will pass through a screen mesh with openings of not greater than 0.1 square mm. In an important aspect, the bran is corn bran, the starch is corn starch, and the bran additive composition comprises aspirated bran having at least about 15 weight percent starch, of which at least about 50 weight percent has been gelatinized. In this aspect, the alkaline agent, such as lime, comprises from about 0.05 to about 5 weight percent based upon the weight of the by-product or bran. The amount of lime, water and cooking are effective for gelatinizing the starch.

The process for preparing the additive composition of the present invention does not result in the production of a liquid waste product and, thus, does not result in the production of a potential environmental pollutant.

DETAILED DESCRIPTION OF THE PREFERRED EMBODIMENTS

Figure 1:
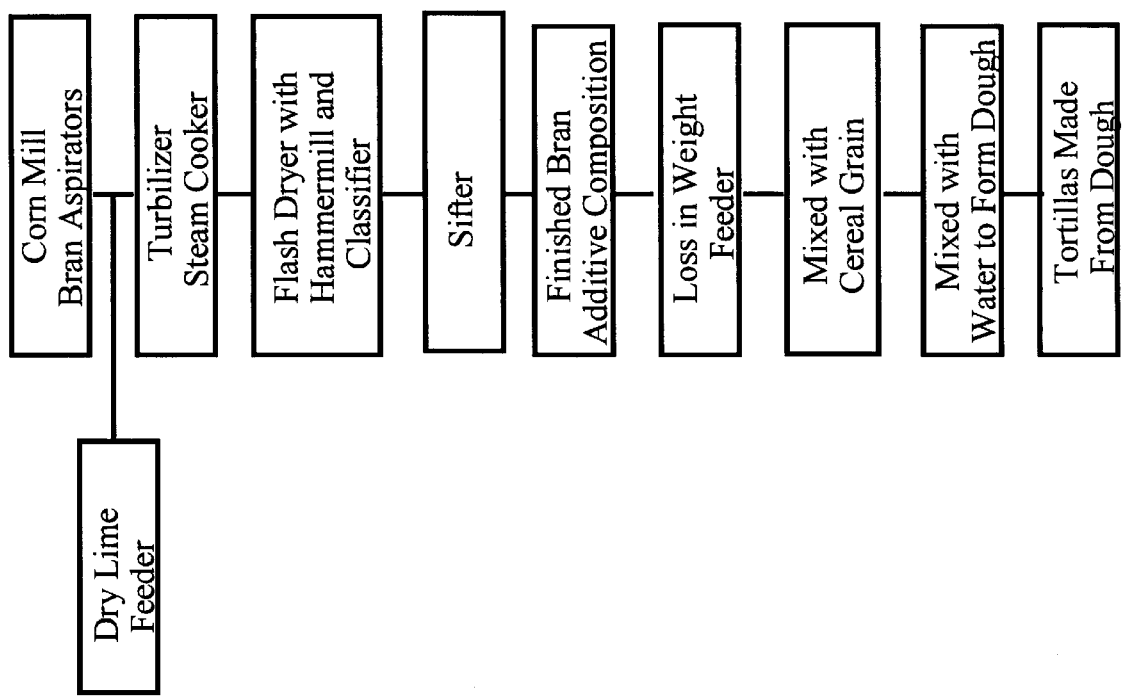
FIG. 1 is a block diagram which shows the most preferred process for making the bran composition additive, flour, dough and tortillas of the present invention.

1. The Additive Composition of the Invention

The present invention provides an additive composition which is made from a cereal grain by-product. The additive enhances the strength and/or shelf life of tortillas and related products produced from flour or dough. The additive composition comprises cereal grain by-product and gelatinized edible starch, at least about 6 weight percent protein, and from about 2 to about 20 weight percent crude fiber. (The fiber can be measured as crude fiber, as neutral detergent fiber or as acid detergent fiber by known methods). In an important aspect, the by-product used to make the additive comprises from about 15 to about 80 weight percent starch and is preferably from about 25 to about 70 weight percent, with from about 30 to about 60 weight percent being most preferred.

The starch in the additive is gelatinized to an extent and is present in an amount, such that when the additive composition is added to masa (or other cereal grain) flour or dough at a level of at least about 0.5 weight percent based upon the weight of the additive and the flour, the additive composition is effective for increasing the strength and/or the shelf life of tortillas or other products made with such flour or dough. Generally, the starch in the additive is gelatinized to at least about 50%, and preferably to at least about 85%, and most preferably to about 100% (i.e., with no native starch remaining). The lower the weight percent of starch which is employed to prepare the additive, the higher the percent of starch gelatinization will generally be needed to prepare the additive and vice versa. For example, a greater percent of starch gelatinized in will be necessary (probably 100%) when the weight percent starch employed to prepare the additive is 20 in comparison with when it is 30 (70% should be sufficient). The degree to which the starch has been gelatinized may be determined by detecting the loss of birefringence in a manner known by those of skill in the art. For example, it may be determined by the absorption, cold paste viscosity, hot paste viscosity and cold water solubles methods described in U.S. Pat. No. 3,404,986.

The milled cereal by-product used to make the additive composition of the present invention may be an aspirated bran obtained from the commercial dry milling of wheat, barley, oats, rice, rye, sorghum or any other cereal or other grain. In an important aspect, the aspirated bran is from the dry milling of whole corn of any type (dent, flint, sweet, pop, hybrid, yellow, white, blue, black, red, etc.) and, more preferably, is obtained from the dry milling of yellow and white corn. The dry aspirated bran has from about 10 to about 15 weight percent moisture. The bran may also be the white or other fiber produced by commercial wet milling of corn or other cereal grains. Different sizes of whole bran, and/or fragments or pieces of the whole bran, may be employed for the bran.

While not intending to be bound by any theory, it appears that the enhanced strength and/or shelf life which is achieved by tortillas and related products produced with the additive composition of the invention is a result of (1) cross linkages which are formed between the calcium present in the additives with the starch, proteins and non-starch polysaccharides, such as pentosans which are present in the by-product used to prepare the additive, and (2) of the highly-gelatinized edible starch. The cross linking and the gelatinized starch form a natural gum or glue. This gum or glue will also generally contain pectic substances, beta glucans and other non-starch polysaccharides.

The by-product also contains at least about 6 weight percent protein, preferably from about 6 to about 11 weight percent protein, with about 8 weight percent being most preferred. This protein may be from the class of albumins, globulins, prolamines or glutelins, for example, zein or glutelin, and adds flavor (good taste) to the products produced with the bran composition additive of the invention.

It has been found that the addition of a proteinaceous material containing tryptophan, such as corn gluten meal, to the additive prior to cooking enhances the flavor of the products prepared with the additive composition of the invention. While levels of from about 1 weight percent to about 40 weight percent of this proteinaceous material of the total mixture being cooked may be added, it is preferable to add a level of about 4 weight percent.

The additive of the present invention may, optionally, contain one or more additional ingredients, such as vitamins (vitamins A, B, C, D, E, etc.), minerals (calcium, phosphorous, sulphur, magnesium, potassium, iron, zinc, manganese, etc.), germ, other carbohydrates, fats or oils, other proteinaceous materials, other nutrients, flavor ingredients, emulsifiers, preservatives, gums and/or like ingredients which may enhance the quality of tortillas and related products produced from flour or dough containing the additive. The quantities of these optional ingredients which may be added to the additive may be easily determined by those of skilled in the art. The quantities of these ingredients should be at a weight percent which is high enough to impart some additional beneficial property to products produced with the additive, but which are not so high as to detrimentally affect the increase in flexibility and/or stability imparted to these products by the by-product and gelatinized starch.

2. Method for Preparing the Additive Composition

The method of preparing the additive composition is illustrated in FIG. 1. As is shown in the figure, the by-product, such as aspirated bran, alkaline agent, such as lime (CaO), and water are mixed and are cooked to provide the bran additive composition. The water and alkaline agent are in amounts effective to gelatinize the edible starch at cooking temperatures of from about 70 to about 100° C. In an important aspect, aspirated bran is mixed with water and an alkaline agent, such as lime, to provide an aqueous alkaline bran mixture. The aqueous alkaline bran mixture contains from about 0.05 to about 5 weight percent lime based upon the weight percent of the by-product used to prepare the additive, and preferably about 1.2 weight percent lime. The amount of alkaline agent in the aqueous alkaline bran mixture is effective for providing the mixture with a pH of from about 7 to about 11 and preferably to about 9. The water in the aqueous mixture is an amount effective for providing the cooked, lime-treated bran with a moisture content of from about 20 to about 85 weight percent. The amount of water used to achieve the latter moisture content is minimized so that an alkaline waste water stream is minimized or eliminated. Moisture may be provided to the cooked product by supplying steam for cooking the product. Steam also minimizes water used in the process and avoids a waste water stream. The moisture content of the cooked mixture will preferably be about 55 weight percent.

In an important aspect, the alkaline agent employed in the process is lime (calcium oxide). Other edible and other non-toxic alkaline materials, such as calcium hydroxide and calcium carbonate may be used. Sufficient amounts of the materials which are alternatives to lime which are equivalent to the use of about 0.05 to about 5 weight percent of lime as aforesaid may be used. The alkaline agent is preferably in a dry form.

The lime can be added in the water employed to cook the bran and starch, can be mixed with the bran and starch prior to water addition, or can be mixed with the bran and starch after water addition. The method for adding the lime to the bran and starch is not critical. However, liquid water is employed to cook the bran and starch.

The loss in weight feeder shown in FIG. 1 is an electronically-controlled, volumetric feeder which sits on a scale and measures the weight loss of the bran and starch at the end of the process, and prior to being added to masa or other cereal grain flour. It allows for the correct addition of a desired amount of an additive composition of the invention to masa or other cereal grain flour.

In a preferred cooking process, about 1.0 weight percent of dry lime is added to the aspirated bran through a dry lime feeder and is mixed with the aspirated bran. Thereafter, water heated to about 200° F. (93° C.) is added into the cooker with mixing in a ratio of about 1 part of water or more to about 1 part of aspirated bran and lime mixture. This should result in a moisture content of the mixture of from about 50 to about 60 weight percent, which is optimal. However, moisture levels within the range of from about 20 to about 80 weight percent will work.

A temperature which is effective to gelatinize the starch to at least about 50%, and preferably to about 100%, should be reached. Because corn starch usually gelatinizes at about 160° F. (71° C.), the cooking temperature, or temperature of the heated water, will generally be at least about 135° F. The temperatures employed for cooking and drying the cereal grain bran and starch should not be so high that the composition being cooked or dried becomes burned and, perhaps, loses its functional properties. The preferred cooking temperature, or temperature of the heated water, will generally be from about 167° F. (75° C.) to about 212° F. (100° C.), and is more preferable from about 195° F. (90° C.) to about 210° F. (99° C.), with about 197° F. (92° C.) being most preferred.

The heated water is added through the cooker, and the suspension is stirred to suspend the lime into the aspirated bran and starch. The mixture is mixed at this temperature for from about 20 seconds to about 600 seconds, and preferably from about 60 to about 300 seconds. The temperature of the lime-treated bran and starch upon its discharge from the cooker will generally be from about 190° F. (87° C.) to about 195° F. (90° C.), and is preferably about 197° F. (92° C.). The moisture content of the lime-treated bran fraction and starch upon such discharge will generally be from about 50 to about 60 weight percent.

The cooking of the by-product, water and alkaline agent can be done in a continuous, or in a batch, process. The heating can be achieved in a number of ways, such as by directly injecting live steam or heated water into the mixtures or by adding steam or heated water to maintain the above-described temperature for the mixtures The cooked, alkaline-treated bran optionally may be stored for a period of time prior to drying. However, it must be stored at a temperature which is high enough to prevent microbial spoilage.

After cooking, the cooked alkaline-treated bran may be used wet or may be flash dried (flash dehydrated) without washing to quickly reduce the moisture content thereof to less than about 10 weight percent, and preferably to less than about 3 to about 5 weight percent. In the flash dehydration, high velocity hot air currents having a temperature of from about 350° F. to from about 390° F. are generally employed for rapid dehydration. The total residence time of the composition within the flash dehydrator is generally from about 2 to about 15 seconds. The method of drying to provide the cooked, dehydrated additive is not critical. Other methods of drying the cooked, lime-treated bran, such as with an oven, a steam tube drier, a belt dryer, a spray dryer, or by other methods known by those of skill in the art, may also be used. The inlet temperature of the flash dryer is about 650° F. (343° C.), and the outlet temperature of the flash dryer is about 220° F. (104° C.).

After drying, the cooked dehydrated additive composition is milled in, for example, a stone mill, disc mill, hammer mill, cylinder mill or other mill, or otherwise size reduced, such that the average particle diameter of the milled cooked dehydrated additive composition is generally less than about 0.1 square mm. (i.e., the particles will pass through a screen having 0.1 square mm openings) and preferably about 99% of it. However, the average particle size of the milled dehydrated additive composition need only be small enough such that it may be added to flour or dough, and tortillas or related products may be made therefrom. Preferably, a hammermill is employed.

The resulting cooked, dehydrated and milled additive composition then is sifted to remove material coarser than that which will pass through about a U.S. No. 40 mesh sieve. The moisture content of the sifted product will generally be less than about 10 weight percent and will preferably be less than about 8 weight percent. However, the moisture content of the sifted product is not critical. It is possible to add wet additives of the invention to wet masa or other dough to produce the tortillas and related products.

3. Preparation of Cereal Grain Flour

The preparation of masa flour which may be reconstituted into a dough by the addition of ambient temperature water is described in the following publications, each of which is incorporated herein by reference in its entirety: U.S. Pat. No. 2,704,257 (Method of Producing Corn Tortilla Flour); U.S. Pat. No. 3,368,902 (Method of Making Tortilla Flour); U.S. Pat. No. 3,404,986 (Method of Manufacturing Corn Flour); U.S. Pat. No. 5,176,931 (Preparation of Masa Flour); U.S. Pat. No. 5,532,013 (Method for the Preparation of Instant French Corn Dough or Masa); U.S. Pat. No. 5,558,898 (Continuous Method of Producing Masa Flour); U.S. Pat. No. 3,404,986 (Process for Manufacturing Corn Flour); U.S. Pat. No. 3,859,452 (Method for Obtaining Nixtamalized Flours); and U.S. Pat. No. 4,594,260 (Process for Producing Nixtamalized Corn Flour).

The additive of the invention is mixed with a masa flour or dough in an amount effective for enhancing the strength and/or shelf life of tortillas or related products produced with such flour or dough in comparison with tortillas and related products prepared without this or other additives. Generally, levels of the additive in the range of from about 0.5 to about 5 weight percent, and preferably in the range from about 1.5 about 3.5 weight percent, of the total weight of the flour or dough is used. Most preferably, about 2.5 weight percent is employed. However, this amount may vary, and may be determined by a tortilla producer or other individual having skill in the art. In an important aspect about 0.5 weight percent additive is effective for extending the shelf life of resulting tortillas at least about 15 days within the use of any other additive to effect an extending shelf life.

4. Preparation of Cereal Grain Dough

Masa can be produced by methods such as traditional cooking, steam cooking, pressure cooking, and extrusion cooking, with or without alkaline treatment of the corn.

The traditional method to process maize into masa (nixtamalization) is described hereinabove. Alkali cooking provides flavor, starch hydration, and water uptake, and partially removes the germ and pericarp (bran) of the corn kernels. The maize kernel is only partially cooked. Steeping distributes moisture and lime throughout the cooked grain. Vigorous washing of the nixtamal removes excess lime, loose pericarp, and part of the germ.

The washed nixtamal is generally ground between lava stones by hand or using a small diesel-powered stone grinder. Stone grinding disrupts swollen starch granules and gives as such sufficient starch damage which will give good dough properties for the wet masa during the production of tortillas. Undercooked nixtamal is difficult to grind; overcooked nixtamal forms sticky masa with poor handling properties. Incomplete cooking of maize can be overcome by adding water and making other adjustments during grinding. The maize is properly cooked when the pericarp is easily removed between the thumb and forefinger.

Significant changes in physical and chemical composition occur when raw corn is cooked into tortillas. There is a physical loss of some of the components of the corn (i.e., germ, pericarp). Additionally, the starch present in the corn becomes gelatinized.

For steam cooking of the maize, the steam cooking cycle generally begins with steam injection into a mixture containing maize, calcium oxide, and a measured amount of water. The steam, which is generally injected from the bottom of the kettle, agitates the maize to promote uniform cooking. The temperature is generally gradually raised to about 165° F. (74° C.) to partially gelatinize the maize starch. Next, the steam is cut off and warm water is generally circulated through the mixture until the temperature drops to about 104° F. (40° C.). The nixtamal is allowed to steep overnight. It is then washed and stone ground using lava or aluminum oxide stones that cut, knead, and mash the nixtamal to form masa. Additional water is often added to the nixtamal during grinding to increase the moisture level in the masa and to cool the stones. A common procedure for cooking corn uses Hamilton steam kettles, in which dry corn is added to the water along with dry, powdered lime.

With pressure cooking, pressure may generally vary between about 5 to about 25 psi, and the average cooking time is generally about 20 minutes. The nixtamal is immediately cooled to about 77° C. and steeped for about 60 minutes with agitation about every 10 minutes.

For extrusion cooking, a whole maize meal combined with calcium oxide (0.2% on meal basis) is extruded under fixed temperature and water flow until the masa reaches its proper consistency.

Limed or non-lime treated corn or other cereal grain dough may also be prepared from limed or non-lime treated corn or other cereal grain flour containing a bran additive of the invention. The dough is preferably made by mixing from about 1.0 to about 1.4 parts by weight of tap water, per 1 part by weight of cereal grain flour containing a bran additive of the invention. However, the amount of water may be adjusted in a manner known by those of skill in the art to yield the desired dough consistency.

5. Incorporation of Additive Composition into Flour or Dough

The additives of the present invention may be added in wet or dry form to corn or other cereal grain lime-treated or non-lime treated flour or dough by one of several different methods.

The additive in dry, powdered form may be mixed with dry corn or other cereal grain flour (nixtamalized or not nixtamalized). Thereafter, the dry mixture may be added with water to form a dough from which tortillas or related products may be made.

Alternatively, the additive in dry, powdered form or wet form or the corn or other cereal grain flour may be mixed with water. Then, the resulting water may be mixed with the remaining dry ingredient (corn or other cereal grain flour or bran composition additive in dry, powdered form) to form a dough from which tortillas or related products may be made.

Dry powdered or wet additive may be added with a tortilla dough and thoroughly homogenized therewith. Tortillas or related products may then be made from this dough.

Other methods of adding the additive of the invention to flour or dough may also be employed.

For example, a flour may be produced by mixing 97.5 weight percent of a corn (limed or non-limed) or other cereal grain flour, such as masa, with 2.5 weight percent of the additive of the present invention. This mixture may then be made into a dough by the simple addition of from about 1 to about 1.4 parts by weight of ambient temperature water with about 1 part by weight (dry basis) of the flour mixture together with kneading. Tortillas and related products may then be prepared from this dough in the manner described hereinbelow.

6. Preparation of Tortillas and Related Products

Masa or other cereal grain dough combined with the additive composition of the invention may be formed into tortillas using a commercially-available, mechanical sheeting device that automatically presses the masa into a thin sheet of dough, and cuts circular dough pieces for tortillas, or other desired shapes (square, rectangle, triangle, etc.) for chips or other related products. Alternatively, the dough may be easily flattened or worked between the hands into a thin disk-like pancake structure, or rolled out with a rolling pin. Then the disk-like pancakes may be stamped or cut from the sheet of dough produced. The cut dough pieces may be conveyed through a gas-fired triple-pass or other oven, which bakes the tortillas or tortilla chips for from about 15 to about 30 seconds at a temperature of from about 302° C. to 316° C. (575° F. to 600° F.), or may be heated on a griddle in the manner described hereinabove, or may be heated by other methods known by those of skill in the art. The baked or heated tortillas may then be cooled and packaged. For tacos, tortilla chips and similar products, they may be equilibrated for a few minutes, and then fried. (The equilibration produces uniform distribution of water in the tortillas, which reduces blisters and oil absorption during frying.) Commercially-available fryers are designed to maintain uniform temperatures (about 190° C. (375° F.)) and produce products with acceptable color and low moisture content. For the preparation of corn chips, the masa is generally extruded or sheeted directly into the oil without baking.

One measure of the strength or flexibility of a tortilla is to determine the flexibility index for a tortilla. A tortilla is bent around a bar of known radius, and this is tried with successively smaller bars until a bar is found which is the smallest around which the tortilla just breaks when it is flexed. A more flexible tortilla will just break when it is bent around a smaller bar than a less flexible tortilla. A higher flexibility index corresponds to bars of lower radius, and indicates higher flexibility.

Typical values for the flexibility index of tortillas over time at room temperature are as follows:

| Time: | 0 hr. | 24 hr. | 48 hr. | 72 hr. | 96 hr. |
|---|---|---|---|---|---|
| Flexibility Index: | 8.5 | 7.7 | 6.5 | 6.0 | 5.5 |

The strength or flexibility of tortillas may also be measured with a commercially-available tortilla texture analyzer, such as the TA.XT2 Analyzer which is available from Stable MicroSystems (Scarsdale, N.Y.). For the evaluation and measurement of tortilla texture and strength with the MicroSystems TA.XT2 Analyzer, tortilla product samples are collected and prepared for analysis in a manner known by those of ordinary skill in the art. A probe is selected and the instrument parameters are set). The samples are then tested by the analyzer, and the data (curves) provided by the analyzer may be read. Factors which may affect the test results are the geometry and freshness of the samples, the type of probe used, the instrument testing parameters used and the interpretation of the data.

5. EXAMPLES

The following examples describe and illustrate the methods for the preparation of the additive composition, flour, dough and tortillas of the present invention.

All materials and pieces of equipment employed in the examples, and generally employed to make the bran composition additives, flour, dough, tortillas and related products of the present invention, are commercially available. Sources for these materials and pieces of equipment include Southland Food Labs (Dallas, Tex.); FEDCO Systems, Inc. (Odessa, Fla.); Illinois Cereal Mills, Inc. (Indianapolis, Ind.); Hosokawa Bepex Corporation (Minneapolis, Minn.); Cargill, Incorporated (Minneapolis, Minn.); The Curry Manufacturing Co. (San Antonio, Tex.); Stable MicroSystems (Scarsdale, N.Y.); Buhler (Udzwill, Switzerland); Werner and Phleider (Germany); Wenger (U.S.A.); and Storck (Netherlands).

Example 1

Compositional Analyses of Aspirated Bran Obtained from Conventional Corn Dry Milling Operations Aspirated bran obtained from a commercial dry corn milling plant were sent to a commercial laboratory for compositional analyses. The results of these analyses with respect to weight percent starch, moisture, crude fat, protein and calcium of the total (100%), on both a non-dry basis and a dry (moisture-free) basis, are presented below.

| Aspirated Bran | COMPOSITIONAL ANALYSIS OF ASPIRATED BRAN | | | | | |
|---|---|---|---|---|---|---|
| | % Starch | % Moisture | % Crude Fat | % Protein | % Calcium | % Other |
| White Bran (Sample #1) | | | | | | |
| Non-Dry Basis | 44.08 | 13.02 | 5.5 | 7.65 | Not | Not |
| Dry Basis | 50.68 | 0 | 6.32 | 8.79 | Calculated | Calculated |
| Yellow Bran | | | | | | |
| Non-Dry Basis | 43.81 | 11.85 | 4.0 | 7.36 | Not | Not |
| Dry Basis | 49.69 | 0 | 4.53 | 8.34 | Calculated | Calcuiated |
| White Bran (Sample #2) | | | | | | |
| Non-Dry Basis | 44.01 | 13.40 | 5.4 | 7.58 | 0.009 | 29.60 |
| Dry Basis | 50.81 | 0 | 6.23 | 8.75 | 0.010 | 34.18 |
| Preground* White Bran | | | | | | |
| Non-Dry Basis | 50.14 | 13.34 | 4.4 | 7.36 | 0.753 | 24.0 |

-continued

COMPOSITIONAL ANALYSIS OF
ASPIRATED BRAN

| Aspirated Bran | % Starch | % Moisture | % Crude Fat | % Protein | % Calcium | % Other |
|---|---|---|---|---|---|---|
| Dry Basis Bran | 57.85 | 0 | 5.07 | 8.49 | 0.86 | 27.69 |
| Non-Dry Basis | 50.93 | 13.06 | 6.60 | 9.51 | Not Calculated | Not Calculated |
| Dry Basis | 58.58 | 0 | 7.59 | 10.93 | | |

*"Preground" as used above means that the fiber has been milled; for example, in a disc mill to reduce the particle size thereof to less than about 0.1 square mm.

Example 2

Compositional Analyses of Three Different Bran Composition Additives of the Invention Three different additives of the present invention which were prepared in the manner described and illustrated for FIG. 1 were sent to a commercial laboratory for compositional analyses of the additives. The results of these analyses with respect to weight percent starch, moisture, crude fat, protein and calcium of the total (100%) bran composition additive, on both a non-dry basis and a dry basis, are presented below.

COMPOSITIONAL ANALYSIS OF
BRAN COMPOSITION ADDITIVES

| Bran Composition Additive | % Starch | % Moisture | % Crude Fat | % Protein | % Calcium | % Other |
|---|---|---|---|---|---|---|
| Sample #1 Non-Dry Basis | Not* Calculated | 3.85 | 4.55 | 8.4 | Not Calculated | Not Calculated |
| Dry Basis | | 0 | 4.73 | 8.73 | | |
| Sample #2 Non-Dry Basis | Not Calculated | 4.89 | 3.28 | 8.20 | Not Calculated | Not Calculated |
| Dry Basis | | 0 | 3.44 | 8.62 | | |
| Sample #3 (Produced from White Bran) Non-Dry Basis | Not Calculated | 3.12 | 5.0 | 8.7 | 0.665 | Not Calculated |
| Dry Basis | | 0 | 5.16 | 8.98 | 0.68 | |

*Because the starch employed to prepare the additives had been gelatinized, it was not possible to determine the weight percent starch present in the additives. However, in theory, the weight percent starch present in the additives will be the same as the weight percent starch employed to prepare the additives. The form of the starch will have changed during the cooking process from not being gelatinized to being at least 50% gelatinized.

Example 3

Production of Masa Dough and Tortillas

Masa dough containing an additive of the present invention is prepared in the manner described below.

100 g of white dent corn is boiled for 20 minutes in 300 ml of water containing 1 g of lime (CaOH). This mixture is allowed to stand overnight (15 hours), and then the supernatant is decanted, and the corn is rinsed thoroughly with water. The alkaline-cooked corn is flash dried, and is then ground in a hand grinder to an average particle size which passes through a standard U.S. No. 40 mesh screen.

To the above product is added with mixing 2 weight percent (dry basis) of the above additive designated Sample #1 in Example 2.

Tepid water is added to the above dry mixture in a ratio of 1:1 parts by weight (dry basis for the flour mixture) with mixing until the dough formed reaches a consistency which is not sticky, but which can be shaped into balls.

The resulting dough is then shaped into 30 g balls, and is pressed with a commercially-available tortilla machine to an approximate diameter of 10 cm.

Each tortilla is then cooked at 350° C. on a preheated stainless steel gas griddle with 1 minute on each side. Then, each tortilla is turned over and pressed with a spatula for 15 seconds to induce puffing. The tortillas are cooled for 2 minutes and stored in sealed plastic bags.

Example 4

Production of Masa Dough and Tortillas

Commercially-available nixtamalized corn flour is mixed into masa in a commercially-available, mechanical dough mixer with about 1 part by weight of water per part of flour on the dry weight. Two weight percent of the bran composition additive of the present invention designated Sample #2 in Example 2 is added to the dough and incorporated therein by the dough mixer.

Tortillas are then prepared from the resulting dough in the manner described in Example 3.

The foregoing examples are provided to enable one of ordinary skill in the art to practice the present invention. These examples are merely illustrative, however, and should

What is claimed is:

1. An additive composition which enhances the strength and/or stability of tortillas produced from flour or dough which includes the additive composition, the additive composition comprising aspirated bran which includes at least about 15 weight percent starch, at least about 6 weight percent protein, and at least about 2 weight percent crude fiber, from about 50 to about 100 percent of the starch in the aspirated bran being gelatinized by cooking it with an aqueous alkaline agent to provide the additive composition, the extent of gelatinization of the starch effective for increasing the shelf life of tortillas produced with masa flour and the additive when the additive is mixed with the masa flour at a level of from about 0.5 to about 5 weight percent of the additive and flour compared to tortillas produced with masa flour without the additive and other shelf life extenders, the additive composition having at least about 0.025 weight percent calcium, based upon the weight of the additive composition.

2. An additive composition as recited in claim 1 wherein the aspirated bran has from about 15 to about 60 weight percent starch.

3. An additive composition as recited in claim 2 wherein a mixture of the additive and water comprising 10 weight percent additive, based upon the weight of water and additive, provides a pH of at least 7.

4. An additive composition which enhances the stability of food products made from masa flour and the additive, the composition comprising:

aspirated corn bran which includes from about 15 to about 60 weight percent starch, at least about 6 weight percent protein, the additive composition having from about 2 to about 20 weight percent crude fiber, from about 50 to about 100 percent of the starch in the aspirated bran being gelatinized by cooking it with an aqueous alkaline agent to provide the additive composition, the alkaline agent selected from the group consisting of calcium oxide, calcium hydroxide, calcium carbonate and mixtures thereof, the extent of gelatinization of the starch effective for increasing the shelf life of tortillas produced with the additive and masa flour when the additive is mixed with the masa flour at a level of about 0.5 to about 5 weight percent of the additive and flour compared to tortillas produced with masa flour without the additive and other shelf life extenders, the additive composition having at least about 0.025 weight percent calcium, based upon the weight of the additive composition bran after the gelatinization of the starch.

5. An additive composition as recited in claim 4 wherein a mixture of the additive and water comprising 10 weight percent additive, based upon the weight of water and additive, provides a pH of at least about 7.

6. An additive composition which enhances the stability of food product made from masa flour, the composition comprising:

aspirated bran comprising from about 15 to about 60 weight percent starch, at least about 6 weight percent protein, and at least about 2 weight percent crude fiber, from about 50 to about 100 percent of the starch being gelatinized to increase the shelf life of tortillas produced with the additive and masa flour when the additive is mixed with the masa flour at a level of from about 0.5 to about 5 weight percent of the additive and flour compared to tortillas produced with masa flour without the additive and other shelf life extenders;

the starch being gelatinized by mixing the aspirated bran with lime and water to provide an aqueous alkaline bran mixture and thereafter cooking the aqueous alkaline bran mixture, the lime comprising from about 0.05 to about 5 weight percent of the aqueous alkaline bran mixture, the amount of water and cooking effective to gelatinize the starch and to provide a cooked alkaline treated bran with a moisture content of from about 20 to about 80 weight percent and an calcium content of at least about 0.025 weight percent.

7. An additive composition as recited in claim 6 wherein the cooked lime treated bran is dried to a moisture content of not more than about 10 weight percent to provide a dried alkaline treated bran and milling the alkaline treated bran to a particle size which will pass through a screen with a mesh of not more than about 0.1 square mm and wherein the additive composition comprises at least about 0.025 weight percent calcium and wherein a mixture of the additive and water comprising 10 weight percent additive, based upon the weight of water and additive, provides a pH of at least 7.

8. A process for making an additive composition for enhancing the shelf life of food products, the process comprising:

(a) mixing aspirated bran with an alkaline agent and water to provide an aqueous alkaline mixture, the aspirated bran comprising from about 15 to about 60 weight percent starch, at least about 6 weight percent protein, and at least about 2 weight percent crude fiber; and (b) cooking the aqueous alkaline mixture to provide a cooked alkaline treated additive composition, the cooking at a time and temperature effective to gelatinize from about 50 to 100 percent of the starch with the amount of the starch being gelatinized to increase the shelf life of tortillas produced with the additive and masa flour when the additive is mixed with the masa flour at a level of from about 0.5 to about 5 weight percent of the additive and flour compared to tortillas produced with masa flour without the additive and other shelf life extenders.

9. A process as recited in claim 8 wherein the bran is corn bran, the additive composition has from about 2 to about 20 weight percent fiber and the alkaline agent is selected from the group consisting of calcium oxide, calcium hydroxide, calcium carbonate and mixtures thereof, the amount of alkaline agent being effective to provide the aqueous alkaline mixture with a pH of at least about 7.

10. A process as recited in claims 8 or 9 wherein the alkaline agent is in an amount effective to provide the additive composition with at least about 0.025 weight percent calcium.

11. A process as recited in claims 8 or 9 wherein the process further comprises drying the cooked-treated product to a moisture content of not more than about 10 weight percent without first removing aqueous lime water from the cooked-treated product to provide a dried alkaline treated product; and milling the dried alkaline treated product to a particle size which will pass through a screen with a mesh of not more than about 0.1 square mm.

12. A cereal grain flour which may be mixed with water to form a dough from which tortillas may be prepared comprising:

(a) a cereal grain flour; and (b) the additive composition of claim 1.

13. A cereal grain dough from which tortillas may be prepared comprising the admixture of:

(a) a cereal grain flour and an additive composition as recited in claim 1.

14. A tortilla comprising a tortilla produced from a cereal grain dough comprising:
a cooked mixture comprising a cereal grain flour and an additive as recited in claim 1.

15. An additive composition for enhancing the stability of food products made from masa flour, the composition comprising:
aspirated corn bran, the aspirated corn bran comprising from about 15 to about 60 weight percent starch, at least about 6 weight percent protein, the additive composition having from about 2 to about 20 weight percent crude fiber, from about 50 to about 100 percent of the starch in the aspirated bran being gelatinized by cooking it with an aqueous alkaline agent to provide the additive composition, the alkaline agent selected from the group consisting of lime, calcium hydroxide, calcium carbonate and mixtures thereof, the amount of alkaline agent in the aqueous alkaline agent and bran mixture effective for providing the mixture with a pH of from about 7 to about 9, the amount of gelatinization being in an amount effective for increasing the shelf life of tortillas produced with the additive and masa flour when the additive is mixed with the masa flour at a level of from about 0.5 to about 5 weight percent of the additive and flour compared to tortillas produced with masa flour without the additive and other shelf life extenders, the additive composition having at least about 0.025 weight percent calcium, based upon the weight of the additive composition.

* * * * *